United States Patent [19]
Terrell

[11] Patent Number: 6,076,731
[45] Date of Patent: Jun. 20, 2000

[54] MAGNETIC STRIPE READER WITH SIGNATURE SCANNER

[75] Inventor: James R. Terrell, Marion, Iowa

[73] Assignee: Intermec IP Corp., Woodland Hills, Calif.

[21] Appl. No.: 09/055,694

[22] Filed: Apr. 6, 1998

Related U.S. Application Data

[60] Provisional application No. 60/043,882, Apr. 10, 1997.

[51] Int. Cl.[7] .............................. G06K 7/10; G06K 7/14
[52] U.S. Cl. ............................... 235/454; 235/493
[58] Field of Search ................. 235/493, 379, 235/380, 454

[56] References Cited

U.S. PATENT DOCUMENTS

| | | | |
|---|---|---|---|
| 4,707,747 | 11/1987 | Rockwell, III | 358/294 |
| 4,782,217 | 11/1988 | Soza et al. . | |
| 4,864,108 | 9/1989 | Hamada et al. | 235/379 |
| 4,868,900 | 9/1989 | McGuire | 235/379 |
| 4,874,934 | 10/1989 | Nakahara et al. | 235/379 |
| 4,912,309 | 3/1990 | Danielson et al. . | |
| 4,972,476 | 11/1990 | Nathans | 235/380 |
| 5,216,233 | 6/1993 | Main et al. . | |
| 5,235,651 | 8/1993 | Nafareieh | 382/46 |
| 5,313,053 | 5/1994 | Koenck et al. . | |
| 5,367,596 | 11/1994 | Chow | 385/116 |
| 5,392,447 | 2/1995 | Schlack et al. | 395/800 |
| 5,479,530 | 12/1995 | Nair et al. | 382/119 |
| 5,484,994 | 1/1996 | Roustaei . | |
| 5,555,105 | 9/1996 | Shahir et al. | 358/473 |
| 5,586,196 | 12/1996 | Sussman | 382/144 |

FOREIGN PATENT DOCUMENTS 2173933 10/1986 United Kingdom .

*Primary Examiner*—Harold I. Pitts
*Attorney, Agent, or Firm*—Suiter & Associates

[57] ABSTRACT

A magnetic stripe reader having an integrated signature scanner and electronic transaction system employing the same provide for simultaneous reading of magnetically encoded data and scanning of an authorized signature typically located above the magnetic stripe located on credit cards or other data cards, thus allowing a merchant or other operator to quickly and discretely compare a tendered signature with the authorized signature. In this manner, the signature may be verified without the need for physical retention of the card until a visual comparison of the signature can be made with the authorized signature on the card.

27 Claims, 10 Drawing Sheets

6,076,731

MAGNETIC STRIPE READER WITH SIGNATURE SCANNER

This Appln claims benefit of provisional appln No. 60/043,882 Apr. 10, 1997.

BACKGROUND OF THE INVENTION

The present invention relates to a signature scanner and, more particularly, to a magnetic stripe reader having an integrated scanner that reads the signature block often found above or below the magnetic stripe on many magnetic stripe cards.

On transaction systems with an integrated magnetic stripe reader, a card such as a credit card, debit card, automated teller machine card, or the like is swiped by the operator, and a receipt, invoice, or the like, is generated for a customer signature. After the customer signs, in order to verify the signature, the system operator must retain the card in order to look at the signature on the back of the card and simultaneously compare it to the signature on the transaction receipt. This card retention and comparison may result in an awkward moment in the customer-operator relationship since the comparison procedure can imply, or at the very least, give the impression of, distrust.

Transaction systems wherein a customer signs a digitizing tablet or a touch screen are capable of displaying the customer's signature for a transaction on a display screen visible to the operator. Although such systems have simplified the process of credit card transactions and other transactions employing magnetic stipe cards, the retention of the customer's card is still required for signature comparison.

In other transaction systems, users may swipe the card themselves, and the card is not given to the operator. In such cases, the signature on the card cannot be compared with a tendered signature, allowing potential fraudulent card use to go undetected. Thus, there still exists the need for an improved method and device that allows for the discreet and quick comparison of a customer's tendered signature and the signature found on the card itself.

SUMMARY OF THE INVENTION

It is an object of the present invention to provide a device, a system, and a method for comparing a signature tendered for a given transaction with the signature found on a magnetic stripe card. It is a further object of the present invention that such a comparison may be made quickly and discreetly, while allowing a customer's card to be handed back immediately after the card is swiped through the magnetic stripe reader.

Additionally, some point of sale systems require the user to swipe the card and the card itself is never handed to the operator. As such, signature verification cannot be performed by the operator of such systems. Therefore, it is another object of the present invention to allow an operator to verify a card user's signature in transaction systems wherein the operator never has physical possession of the card.

These and other objects of the present invention are provided by a magnetic stripe reader comprising an optical scanner capable of reading the image of a signature provided in a signature block typically located adjacent to and parallel to a magnetic stripe on a credit card or the like.

The present invention also relates to a transaction system comprising a magnetic stripe reader and optical scanner and a display device for displaying the scanned signature to the system operator. In a preferred embodiment, the transaction system according to the present invention also comprises a signature input device such as a touch screen or digitizing tablet, thereby allowing a side-by-side on-screen comparison of the signature on the card and the signature tendered for the particular transaction.

The present invention also relates to a method of signature verification employing the magnetic stripe reader and optical scanner according to the present invention.

BRIEF DESCRIPTION OF THE DRAWINGS

The detailed description of the invention may be best understood when read in reference to the accompanying drawings wherein.

DETAILED DESCRIPTION OF THE INVENTION

Figure 1A:
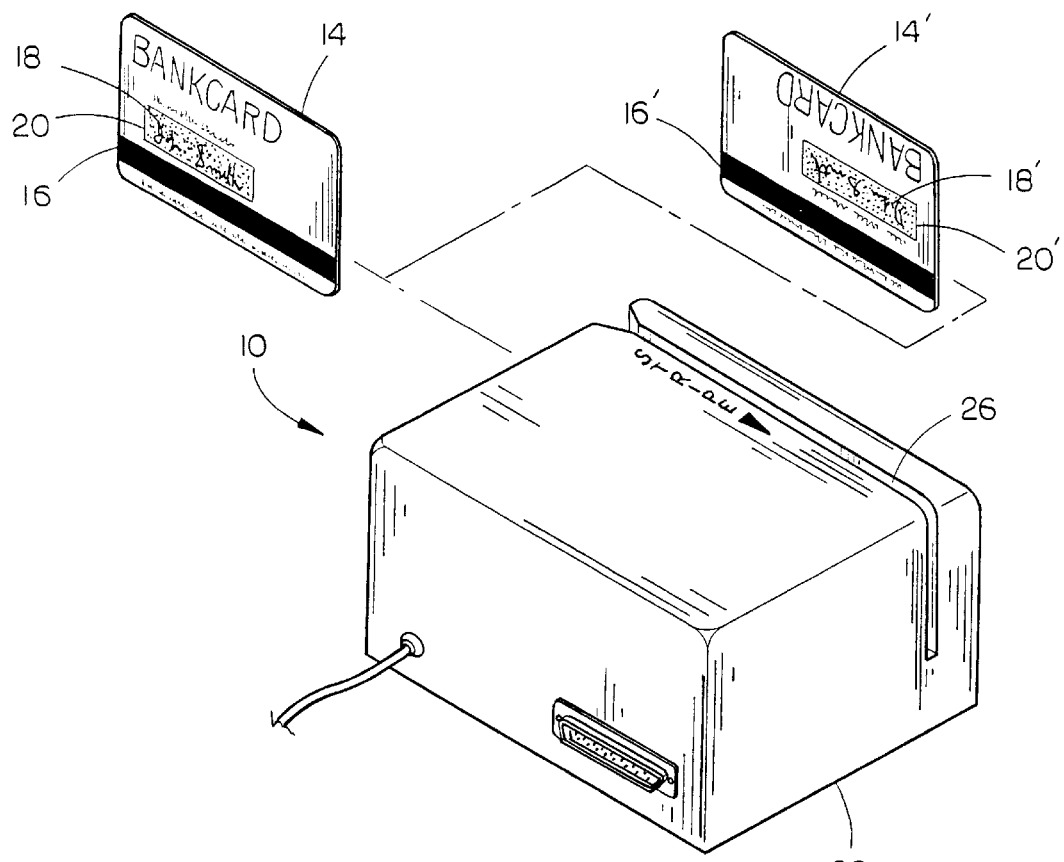
FIG. 1A shows a perspective view of a magnetic stripe reader having a signature scanner according to the present invention.

FIG. 1A is a perspective view of a magnetic stripe reader 10 having an optical scanning unit 32 (FIG. 2) and magnetic stripe cards 14 and 14'. Magnetic stripe reader 10 allows the data encoded on magnetic stripe 16 or 16' to be read and the simultaneous scanning of a signature 18 or 18' located in signature block 20 and 20' is a single swipe of card 14 or 14' through card swipe slot 26.

Cards 14 and 14' depict a common arrangement of magnetic stripes 16 and 16' and signature blocks 20 and 20'. Although the present invention will be described herein as primarily pertaining to financial transactions such as credit card transactions, it will be understood by those skilled in the art that the magnetic stripe reader having a signature scanner according to the present invention is useful for any transaction wherein data encoded on a magnetic stripe, such as card identifying data and the like, and the visual verification of indicia on a card is needed.

Therefore, as used herein, the term "magnetic stripe card" refers to any such card containing magnetically encoded data, including, for example, credit cards, debit cards, ATM cards, electronic money cards, or any other financial transaction cards. As used herein, "magnetic stripe cards" also include cards employed by institutions containing data thereon, including, for example, cards issued by health care providers to patients, by institutions that allow for employee or membership identification cards that allow for building access or access to secured areas, and the like.

Figure 1B:
FIG. 1B shows a magnetic stripe card having a tamper-proof signature block.

FIGS. 1A and 1B show what is generally considered the "back" of a magnetic stripe data card 14 or 14', such as a credit card or the like. Each of cards 14 and 14' are shown in a typical configuration with magnetic stripes 16 and 16' aligned parallel to, and close to, the lengthwise edges of cards 14 or 14', respectively. Signature blocks 20 and 20' are aligned adjacent to and parallel to magnetic stripes 16 and 16'. It will be noted, then, that for both the card 14 configuration and the card 14' configuration of magnetic stripes 16 and 16', and signature blocks 20 and 20', respectively, are the same, with the difference being that the preprinted indicia, such as bank name and/or logo, customer service information, and the like, are reversed with respect to each other. Because the preprinted indicia found on magnetic stripe cards are typically found in either orientation with respect to the magnetic stripe, it will likewise be typical for the signatures 18 and 18' to be found in both orientations. Thus, if a card with the indicia and signature oriented as depicted on card 14 is swiped through reader 10, the orientation of signature 18 will be right side up, whereas if a card with indicia and signature as shown on card 14' is swiped through the reader 10, the signature 18' will be upside down. Because both configurations are typical, it is preferable that the software for displaying the scanned signature comprises an image rotation feature, e.g., whereby the image of the scanned signature is rotated 180° in response to user input. In an especially preferred embodiment, the software is programmed to statistically analyze the shape of the digitized signature, for example, by determining which edge of the signature is more linear, in order to make an initial determination of the orientation in which the signature is most likely to have been scanned.

Although the invention will be described in terms of signature verification by comparison of a signature adjacent to a magnetic strip, it will be understood by those skilled in the art that the invention is not limited to any particular orientation of magnetic stripe and signature. Also, indicia other than a signature may be scanned, such as, for example, a card holder's photo located on the card. For example, the magnetic stripe reader according to the present invention could be adapted for cards wherein the card indicium to be scanned, i.e., a photograph, a signature, or the like, and the magnetic stripe are located on opposite sides of the card, etc.

As shown in FIG. 1A, magnetic stripe reader 10 comprises a housing 28, e.g., an injection molded plastic housing, enclosing the internal components of reader 10 and forming a swipe slot or channel 26 through which a card 14 may be drawn or slid through.

FIGS. 2A–2E show cutaway views of the reader 10 according to the present invention from within slot 26, showing magnetic read head 30 and a fixed position optical scanning unit 32. Scanning unit 32 comprises one or more LEDs 33 which emit light through scan window 34. The light is reflected from signature block 20 of card 14 (see FIGS. 1A and B) as the card is passed through the slot 26 and the reflected light is detected by a photodetector, such as a vertical charge-coupled device (CCD) array, and converted to digital data. The scanning unit may optionally comprise one or more lenses 35 to focus and/or filter the light reaching the photosensor. The lens selected will depend on the wavelength of the LEDs selected, the distance from the reflected image to the photosensor, and the like, as would be understood by those of ordinary skill in the art.

Figure 2A:
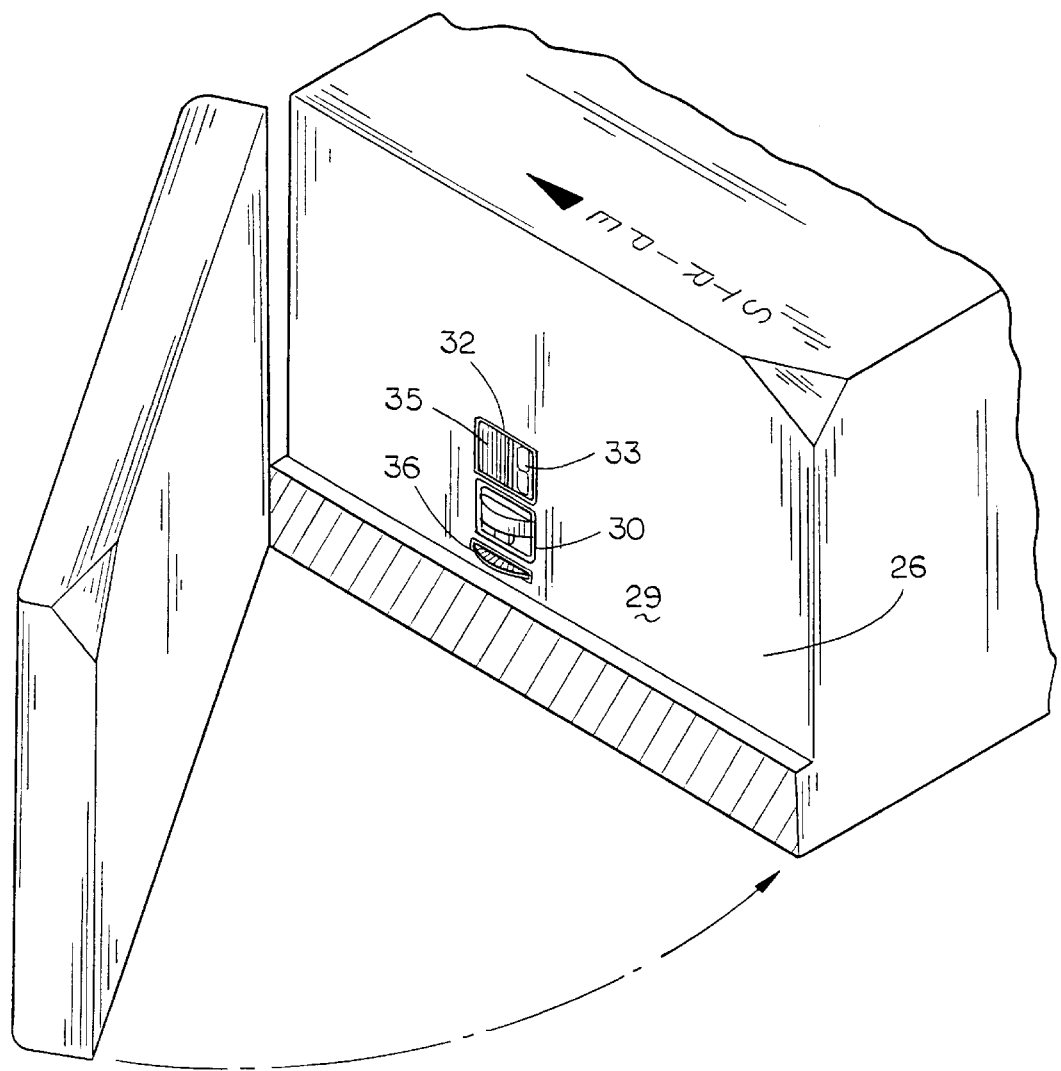
FIGS. 2A–2E show views of the swipe slot for several embodiments of the magnetic stripe reader according to the present invention.

The stripe reader/signature scanner 10 preferably further comprises an encoder for synchronizing the movement of the card 14 as it passes through channel 26. The encoder may comprise, for example, a rotary encoder 36 which is rotated as a card is passed through slot 26 and provides a train of pulses for triggering the photosensor to driver circuitry and memory controller logic. As the encoder is rotated through frictional engagement with the card, the pulses may then be translated into information representative of the movement of the card as it is passed through slot 26. In FIG. 2A, rotary encoder 36 is depicted as a disk rotatably mounted and slightly extending through an aperture in wall 29 of channel 26 as to engage a card as it is passed through the slot 26. The encoder signal may also serve to initiate the scanning process.

Figure 2B:
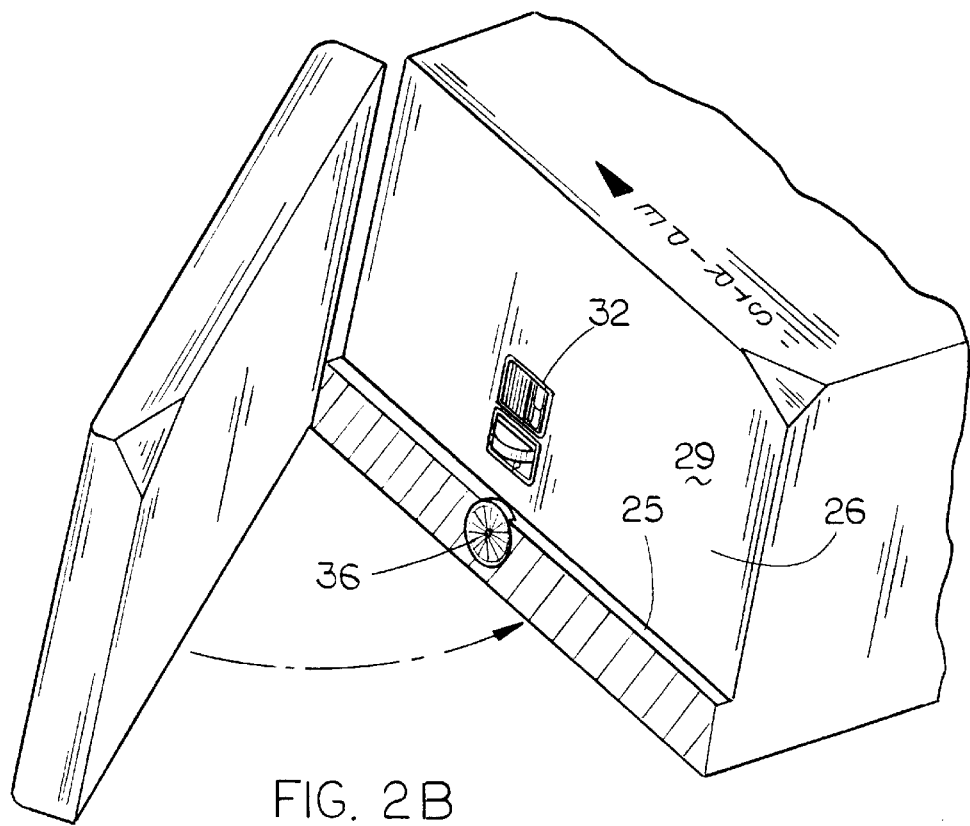
Figure 2C:
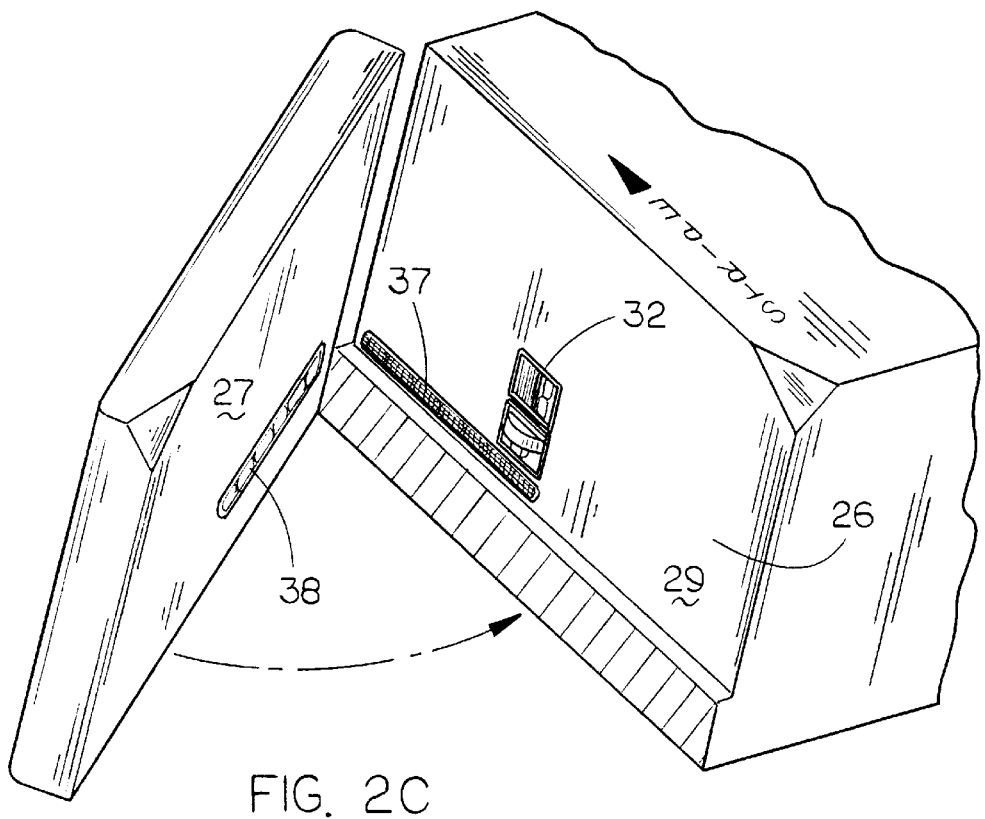

In FIG. 2B, rotary encoder 36 is depicted as centrally located in the swipe slot 26 and protruding through an aperture in base 25 of channel 26. In FIG. 2C, the encoder comprises an LED array 38 is located along the base of a wall 27 of channel 26. The base of the opposite wall 29 of channel 26 comprises a photodetector array. This configuration is advantageous in that light from the encoder LED array 38 will be blocked during passage of a card from impinging on the scanning unit 32. As the card passes through channel 26, the light from the LED array 38 is prevented from reaching the oppositely disposed photosensor array 37. In this manner, the light blockage tracking card movement may be converted to information representing the movement of the card through channel 26. Alternatively, in an embodiment not shown, encoder led array 38 may located along the base of wall 29 and photodetector array 37 is located at the base of wall 27.

Figure 2D:
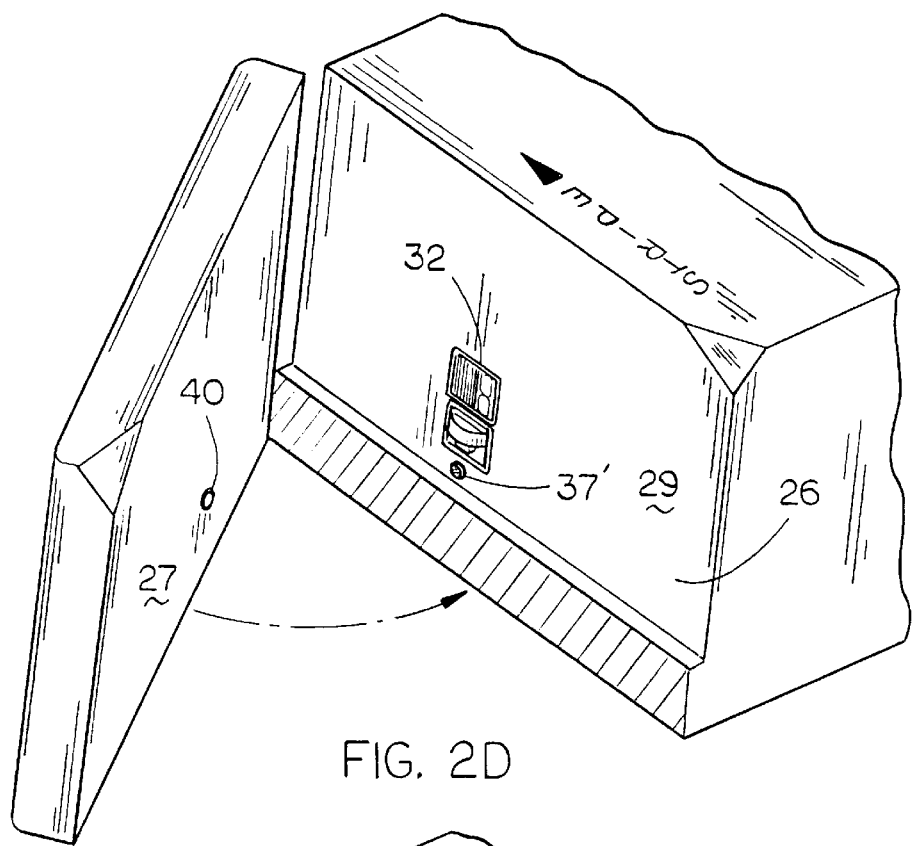

In FIG. 2D, a single LED 40 is located along the base of the channel 26 wall 27. A photodetector 37' is oppositely disposed. In this manner, the period during which the light is blocked can be converted into information approximating the movement of the card through channel 26. Since card size is fairly uniform, by measuring the time during which the light from LED 40 was blocked from reaching the oppositely disposed photodetector 37', an average velocity of the card as it passes through the channel 26 can be determined and provides an approximation of the movement of the card. As detailed above, it is advantageous to position LED 40 along wall 27 and photodetector 37' in an oppositely disposed position on facing wall 29 such that light emitted from LED 40 will not impinge on scanning unit 32, although LED 40 may likewise be placed on wall 29 and photodetector 37' along wall 27 if desired.

It will be understood by those skilled in the art that the present invention is not limited to any particular arrangement of the encoders. For example, when an encoder LED or LED array is employed, the light from the encoder LED may be prevented from reaching the scanning photodetector by means of selection of LEDs of appropriate wavelength, the use of filters and/or focusing lenses.

Figure 2E:
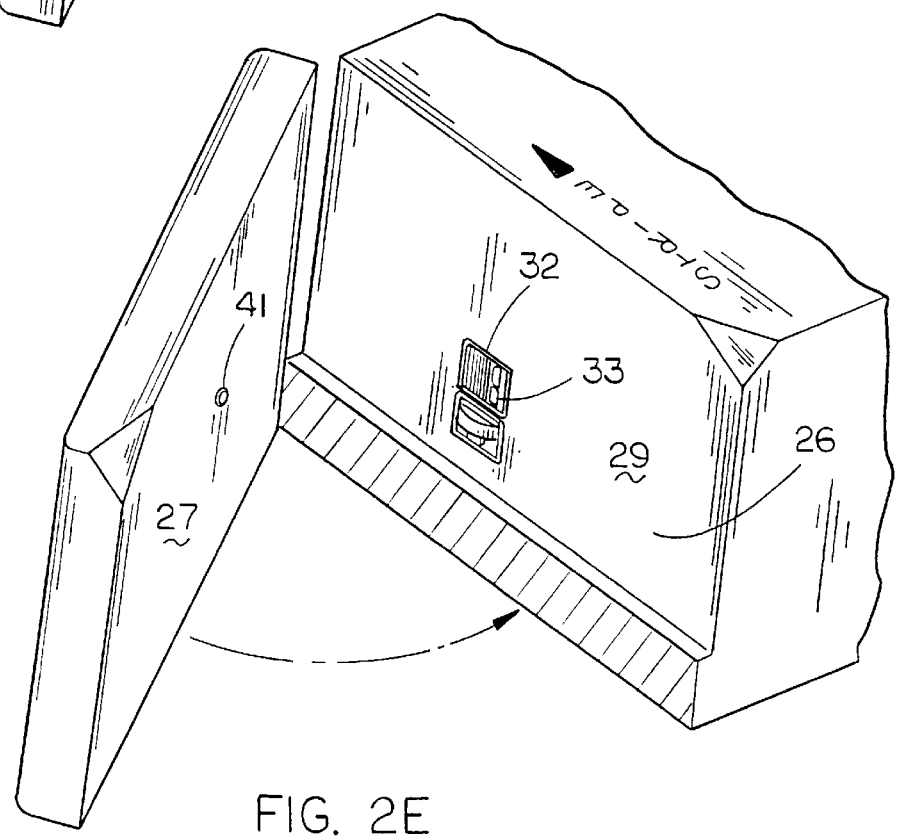

FIG. 2E shows a particularly preferred embodiment wherein wall 27 of channel 26 opposing wall 29 containing the scanning unit 32 may comprise a photodetector 41 aligned with the LED source 33 on the scan module 32, wherein light blockage by a swiped card may be employed as a positive indication of the scanning process and to provide the average velocity of the card as it is swiped. In other words, the embodiment shown in FIG. 2D is modified such that LED 33 functions both as providing the reflected illumination for the scanning process, and as an encoding LED, i.e., functioning as the encoding LED 37' of FIG. 2D.

Finally, in yet another embodiment, the card movement encoder may be omitted and the vertical scan lines comprising the signature may be displayed using a horizontal spacing according to a predetermined configuration based on, for example, a presumed or average swipe speed. Also, the detection of the card edges by scanning unit 32 (FIGS. 2A–2E) may be employed as the means for detection of the velocity of the card through slot 26 (FIGS. 2A–2E), for example, by determining the average velocity of the card as it is swiped through slot 26, without the need for a separate card movement encoder.

Figure 3A:
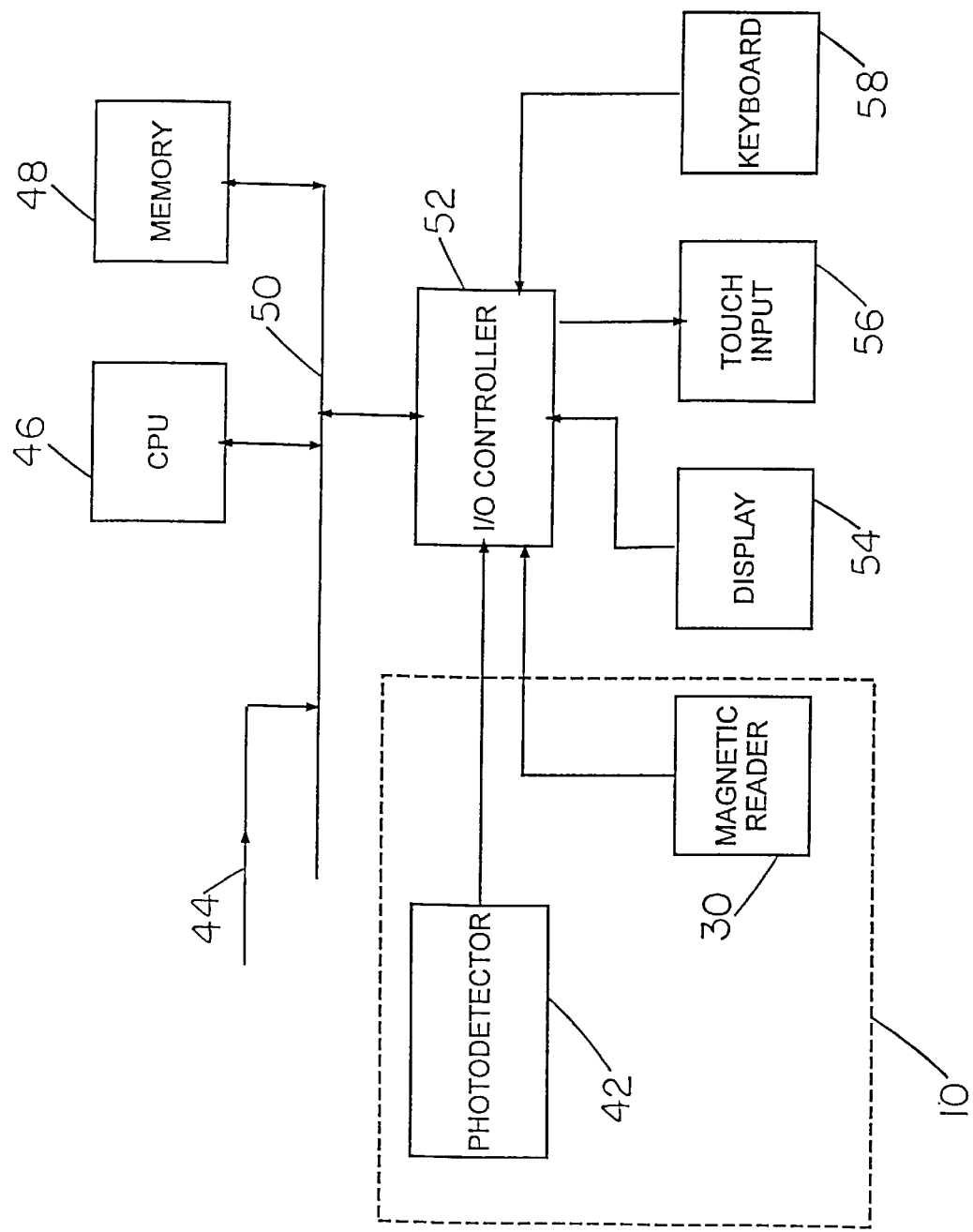
FIGS. 3A and 3B are block diagrams of exemplary systems employing the scanning magnetic stripe reader according to the present invention.

FIG. 3A shows a simplified block diagram of an exemplary system according to the present invention comprising a photodetector 42, encoder pulse line 44, CPU 46, memory 48, data bus 50, input/output controller 52, magnetic stripe reader 30, display 54, touch input 56, and keyboard 58. As the card passes the scanning unit, photodetector 42 produces a single bit binary output for vertical samples of the signature 18 (FIGS. 1 and 2). Encoder pulse line 44 transmits information regarding the movement of the card for assembly of the digitized for storage in memory or on screen display. Encoder pulses may be generated by rotary encoder wheel 36 (FIGS. 2A and 2B) or a photodetector array 42 for detecting card motion as depicted in FIG. 2C. Line 44 may also comprise a timing or clock voltage line, e.g., as where an average velocity of the card is determined as in FIG. 2D.

Image inversion can be employed to reverse the output from the photodetector, either by separate circuitry (not shown), or by software running on CPU 46. The bit-mapped image can be output directly to a display 54, such as a CRT display, LCD display, or the like, via I/O controller 52 as each scan line is received, or alternatively, the image may be assembled from the individual scan lines and processed by CPU 46 and stored in memory 48. The image may be analyzed to determine the top and bottom of the signature for correct display. The system also preferably includes a touch responsive input device, such as a touch screen, touch pad, digitizing tablet, and the like, whereby the input signature and the scanned signature may be compared side-by-side on display 54. The system also preferably includes a means for image rotation in response to operator input, e.g., via keyboard input 58.

Figure 3B:
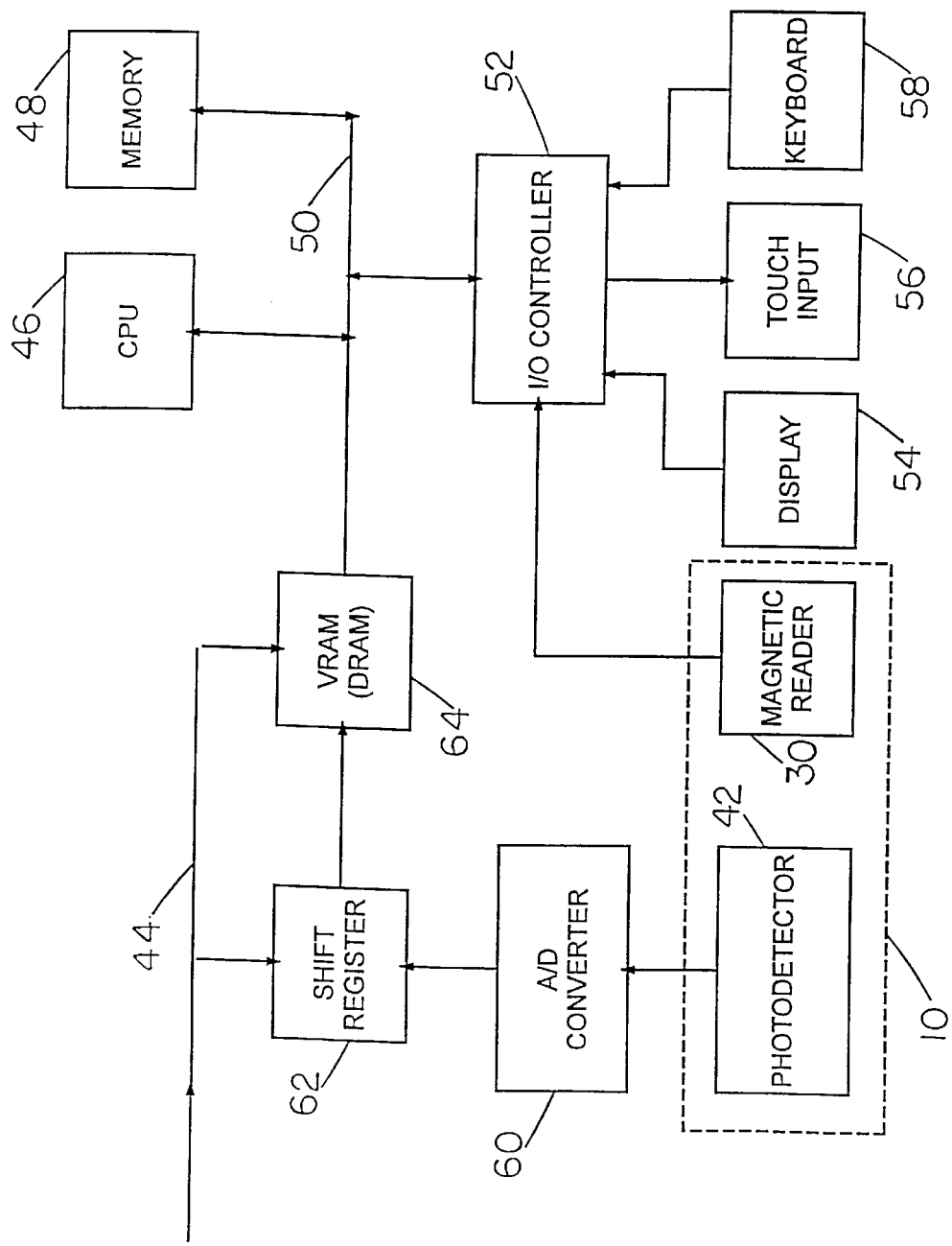

In FIG. 3B, the analog output of the photodetector array 42 corresponding to each scan line is input to analog to digital (A/D) converter 60 which is loaded into shift register 62 and shifted into video RAM 64. Although the analog output of the photodetector may be registered directly as binary output, it is preferred to use an A/D converter. In an especially preferred embodiment, an analog to digital converter is employed to produce a multi-bit binary representation of the scanned signature, and thereby, for example, allowing gray scale imaging of the signature block. Gray scale imaging is particularly preferred in view of the anti-tampering patterns commonly found on the signature blocks of magnetic stripe cards (see FIG. 1B). The shift register may be clocked by line 44 which may receive clock pulses or encoder pulses from a card movement encoder as depicted in FIGS. 2A–2E.

Although the configurations depicted in FIGS. 3A and 3B contemplate a magnetic stripe reader employed as an input device to an external computer terminal, a magnetic stripe reader with signature scanner having the circuitry, such as an A/D converter, memory such as RAM and/or ROM, and a microprocessor, within a single self-contained housing, is also within the scope of the present invention.

Figure 4:
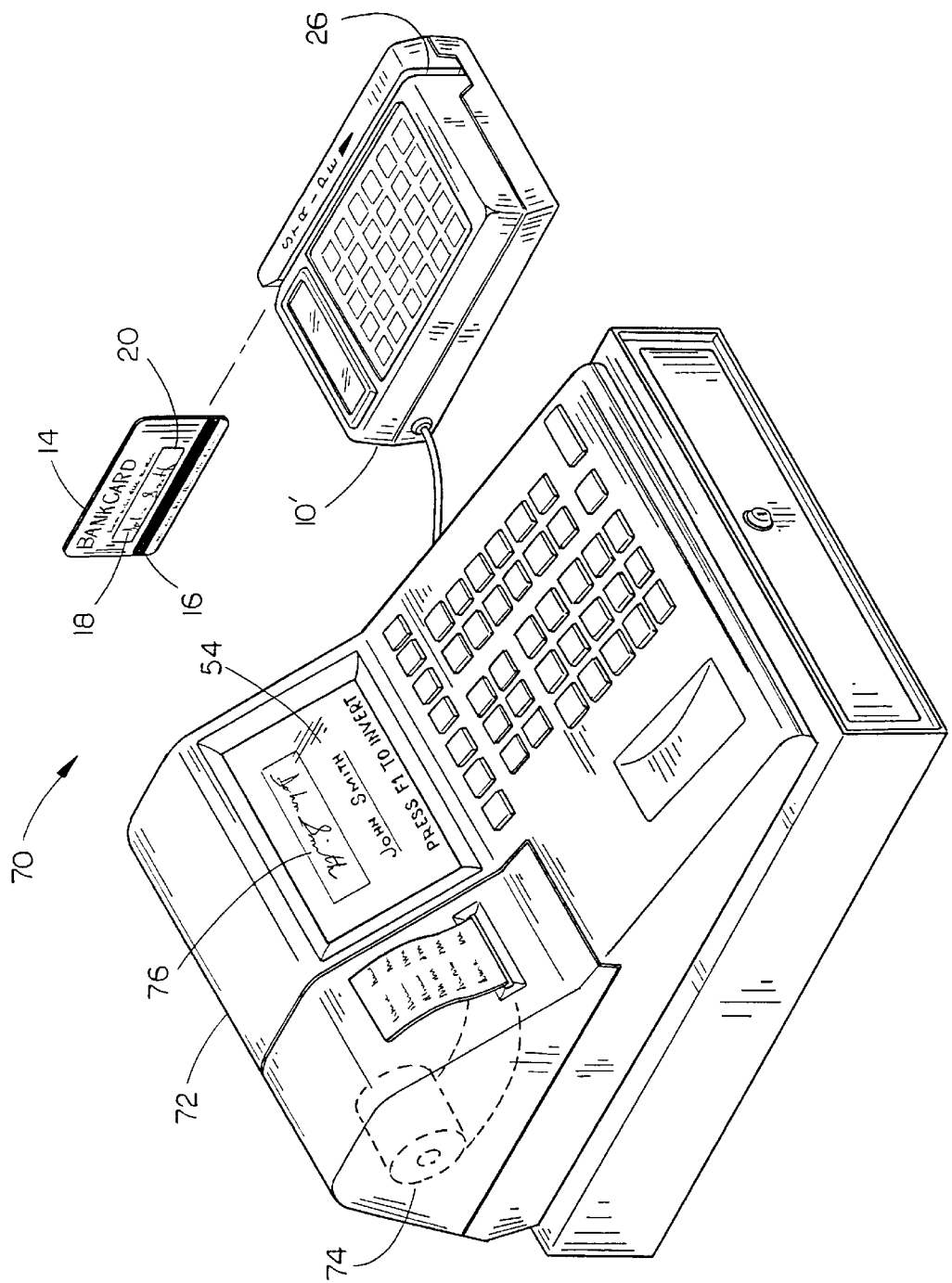
FIG. 4 shows a point of sale system employing a magnetic stripe reader having a signature scan head according to the present invention.

FIG. 4 shows an exemplary system 70 employing the magnetic stripe reader with signature block scanner 10' according to the present invention. System 70 comprises data transaction terminal 72 comprising a printer 74 and magnetic stripe reader/signature scanner 10'. In a typical transaction using such a system wherein a magnetic card is used, such as a credit card purchase, the operator rings up the customer's purchase on terminal 72 and the customer hands the card to the operator as payment. The operator swipes the card 14 through slot 26 of magnetic stripe reader 10'. Account information associated with the card, such as account number, expiration date, issuing institution, and the like, encoded on magnetic stripe 16, is read and the transaction details may be communicated electronically to the card issuer and posted to the customer's account. The customer's authorized signature 18 located in signature block 20 is simultaneously scanned and displayed on display screen 54.

Additionally, a paper copy of the transaction information is generated by printer 74 for the customer's signature. The prior art systems require that, for signature verification, the operator retain the card 14 until the customer's signature for the transaction so that the authorized signature 18 and the transaction signature tendered in the operator's presence could be visually compared. With the system 70 according to the present invention, card 14 may be immediately handed back to the customer, and verification of the tendered signature may discretely be compared with the displayed imaged signature 76. Also, the present invention provides the additional security of signature verification when employed with systems that allow the customer to scan the card without handing the card to the operator.

Figure 5:
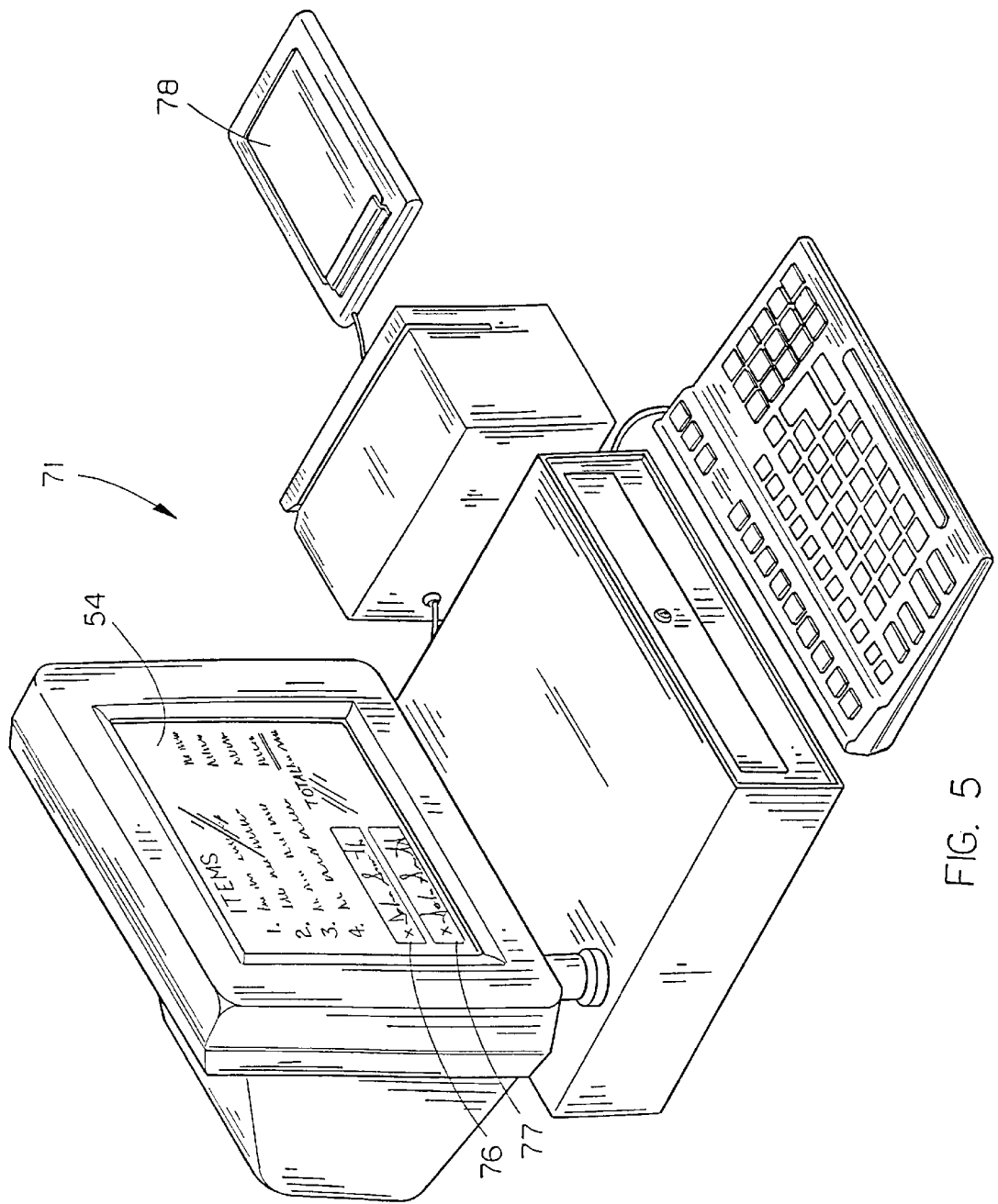
FIG. 5 shows another embodiment of a point of sale system according to the present invention.

FIG. 5 depicts an especially preferred embodiment of a transaction system 71 according to the present invention. The system is similar to system 70 depicted in FIG. 4, but employs a touch input device 78. Touch input device 78 comprises a digitizing tablet, touch screen, or the like. In one exemplary embodiment, a paper copy of the transaction receipt is generated and placed over the digitizing tablet 78 for the customer's signature. In this manner, the imaged signature 76 and the digitized signature 77 input via digitizing tablet 78 may be compared side by side on display screen 54. In an especially preferred embodiment, not shown, the paper copy of the receipt is printed and fed directly over the digitizing tablet such that the paper copy does not need to be removed from the printer before signing. Alternatively, the signature need not be captured on paper, but may be input directly on the sensing surface of a touch responsive input device, e.g., with a stylus, and the captured signature may, for example, be printed on the receipt by the terminal printer, along with other transaction details.

In a preferred embodiment, wherein a signature is input via a touch screen or a digitizing tablet 78, the scanned signature 76 and the digitized input signature 77 may be analyzed statistically and compared in software to determine the similarity and thus, the likelihood that the input signature is valid, between the scanned signature and the input signature, thereby adding an electronic verification means in addition to the visual verification performed by the operator. Additionally, the scanned images may be optionally compressed and stored in memory for later verification either manually or by a software comparison of the scanned image and the input image. Additionally, where a card issuer stores digitized images of authorized user's signatures, e.g., in a file or database, a card user's signature stored in memory may be compared electronically with the scanned image to determine whether a signature on the card has been tampered with.

Figure 6B:
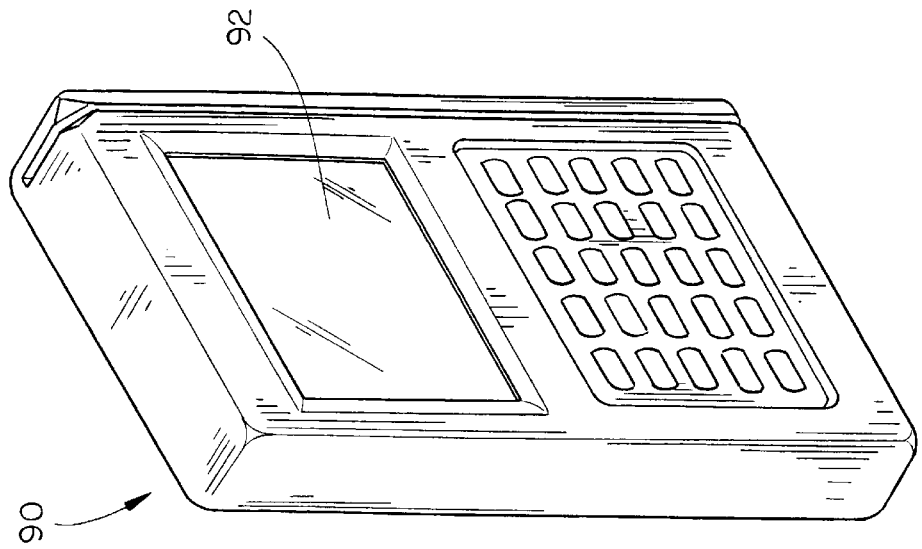
FIGS. 6A and 6B show portable data terminals having a magnetic stripe reader according to the present invention.
Figure 6A:
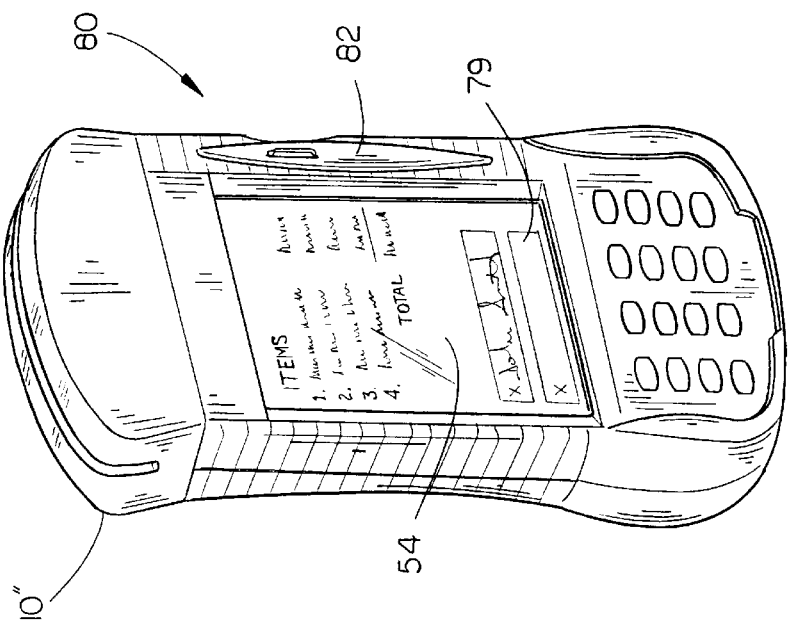

FIG. 6A shows a portable data terminal 80 and having a magnetic stripe reader with scanner 10" mounted thereon. Such data terminals may be used in a mobile setting, such as shipping or delivery situations, or the like. In system 80, a customer's signature may be obtained via touch screen input 79 overlaying display 54, e.g., using stylus 82. The scanned images may be stored in memory for later uploading to a computer, computer network, such as a LAN or WAN.

For point of sale transaction systems or other non-portable systems, scanned signatures may be uploaded to a mainframe computer or network after each image is scanned, or, alternatively, images may be stored in a data terminal memory for batch processing. For portable devices, where storage of obtained signatures input via a touch device is desired, it is preferable to provide sufficient memory for storage of the signatures for later batch processing. For example, in a mobile environment, it is preferable that the data terminal comprise sufficient memory for a given work shift or route. Data may likewise be stored on removable memory storage media. The data may be transferred by docking the unit in a docking station that allows data transfer. The docking station may be of the type that additionally recharges the data terminal's batteries. Such docking stations may likewise be mounted in a vehicle whereby the vehicle's power supply may provide data terminal recharging. Batch data transfer may be via an electrically conductive link such as a cable or modem, or the like, or via a wireless link, such as RF, IR, ultrasound, optical, including fiber optic, cellular links, or the like. When a vehicle dock is employed, the dock may provide a link to a high gain antenna for wireless transfer of data.

FIG. 6B shows a portable data terminal 90 which may, for example, be located at a point of sale terminal wherein customers may swipe their cards themselves. Even though the operator never has possession of the card in such transactions, signature verification of the card user's signature is possible with the card reader/scanner according to the present invention, e.g., by displaying the scanned signature on an external display (not shown). The display screen 92 may display transaction details or request customer input from keypad 94 for approval of the transaction or the transaction amount.

Portable data terminals 80 and 90 as depicted in FIGS. 6A and 6B may further comprise bar code readers, RF transmitters, IR data links, and the like (not shown).

Figure 7:
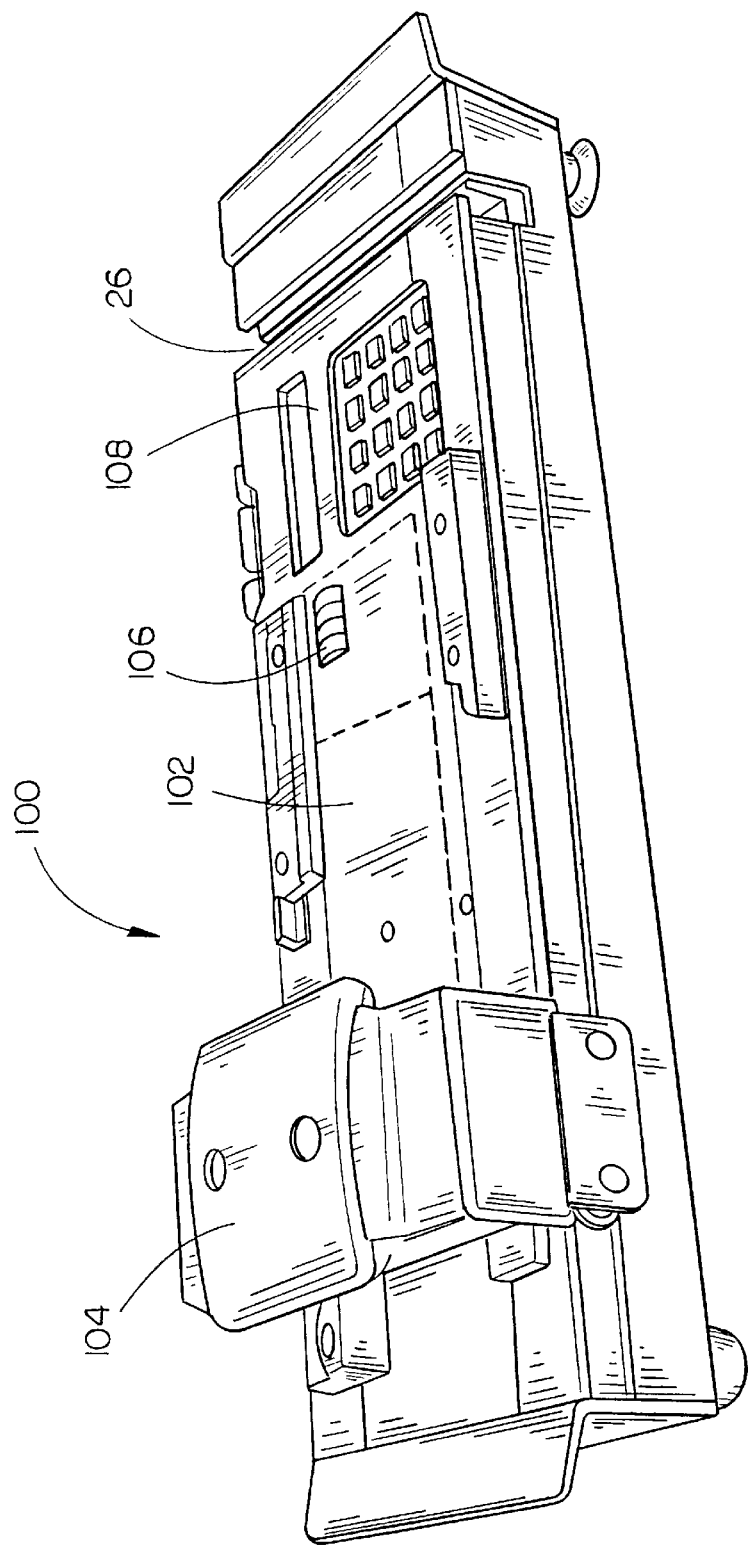
FIG. 7 shows a magnetic stripe reader having an optical signature scanner and further comprising an embossed character imprinter.

FIG. 7 shows a magnetic stripe reader 100 according to the present invention having a swipe slot 26 a surface 102 wherein a card may be placed for imprinting a receipt with card account number and expiration embossed on the surface of a card by moving imprinter 104 over the receipt and card. A receipt may also be imprinted with vendor information, the date, or other indicia 106 present on surface 102. In a preferred embodiment, the magnetic stripe reader 100 also comprises an integrated data terminal 108. The present invention may also be used in conjunction with an electronic embossed character reader (not shown).

Although the invention has been described in connection with certain particular and preferred embodiments thereof, it would be evident to those skilled in the art that various revisions and modifications of the herein described embodiments, as well as many additional applications to those described by way of example herein, can be made without departing from the spirit and scope of the invention. Accordingly, scope of the invention should be determined solely by the appended claims and their legal equivalents.

What is claimed is:

1. An apparatus for reading a magnetic stripe card, said magnetic stripe card being of a type having a magnetic stripe having data encoded thereon, and said magnetic stripe card being further of a type including a signature block thereon, said signature block for manual entry of a signature therein and said signature block being located in proximity to said magnetic stripe, said apparatus comprising:

(a) a housing having a swipe channel formed therein, said channel comprising two opposing walls located a sufficient distance apart to allow passage of a magnetic stripe card;

(b) a magnetic stripe reader head mounted within said housing and extending through an aperture in one of said opposing walls; and (c) an optical scanning unit positioned in said housing;

wherein said magnetic stripe reader head and said optical scanning unit are disposed channel so as to allow simultaneous reading of said data encoded on said magnetic stripe and scanning of a signature located in said signature block during a single swipe of said magnetic stripe card through said channel.

2. The magnetic stripe reader according to claim 1 wherein said optical scanning unit comprises light source and a CCD array.

3. The magnetic stripe reader according to claim 2 wherein said light source comprises a laser light source.

4. The magnetic stripe reader according to claim 2 wherein said light source comprises one or more LEDs.

5. The magnetic stripe reader according to claim 2 wherein said CCD array comprises a linear array.

6. The magnetic stripe reader according to claim 2 wherein said CCD array comprises a two-dimensional array.

7. The magnetic stripe reader according to claim 2 wherein said optical scanning unit comprises a lens.

8. The magnetic stripe reader according to claim 7 wherein said lens comprises a focusing and/or filtering lens.

9. The magnetic stripe reader according to claim 1 further comprising a means for making an imprint of embossed characters.

10. A transaction terminal comprising a data terminal and an apparatus for reading a magnetic stripe card, said data terminal comprising a microprocessor and a display screen, said magnetic stripe card being of a type having a magnetic stripe having data encoded thereon, and said magnetic stripe card being further of a type including a signature block thereon, said signature block for manual entry of a signature therein and said signature block being located in proximity to said magnetic stripe, said apparatus for reading a magnetic stripe card comprising:

(a) a swipe channel comprising two opposing walls of a sufficient distance apart to allow passage of a magnetic stripe card;

(b) a magnetic stripe reader head mounted within said housing and extending through an aperture in one of said opposing walls; and (c) an optical scanning unit;

wherein wherein said magnetic stripe reader head and said optical scanning unit are disposed within said channel so as to allow simultaneous reading of said data encoded on said magnetic stripe and scanning of a signature located in said signature block during a single swipe of said magnetic stripe card through said channel.

11. The transaction terminal according to claim 10 wherein said optical scanning unit comprises a light source and a CCD array.

12. The transaction terminal according to claim 11 wherein said light source comprises a laser light source.

13. The transaction terminal according to claim 11 wherein said light source comprises one or more LEDs.

14. The transaction terminal according to claim 11 wherein said CCD array comprises a linear array.

15. The transaction terminal according to claim 11 wherein said CCD array comprises a two-dimensional array.

16. The transaction terminal according to claim 11 wherein said optical scanning unit comprises a lens.

17. The transaction terminal according to claim 16 wherein said lens comprises a focusing and/or filtering lens.

18. The transaction terminal according to claim 10 further comprising a means for making an imprint of embossed characters.

19. The transaction terminal according to claim 10 comprising a signature input device selected from a digitizing tablet and a touch screen.

20. The transaction terminal according to claim 10 comprising means for displaying an image of a scanned signature on said display screen.

21. The transaction terminal according to claim 20 further comprising means for rotating an image of a scanned signature displayed on said display screen.

22. The transaction terminal according to claim 19 comprising processing means for displaying an image of a signature input via said signature input device and a scanned signature on said display screen simultaneously.

23. The transaction terminal according to claim 22 further comprising processing means for comparing a scanned signature image and a signature input via said signature input device.

24. The transaction terminal according to claim 20 further comprising means for rotating an image of a scanned signature displayed on said display screen.

25. A method for conducting a transaction, said transaction employing a magnetic stripe card, said magnetic stripe card being of a type having a magnetic stripe, said magnetic stripe having data encoded thereon, and said magnetic stripe card being further of a type including a signature block thereon, said signature block for manual entry of a signature therein and said signature block being located in proximity to said magnetic stripe, said method comprising the steps of:

providing an apparatus for reading a magnetic stripe card, said apparatus comprising:

a housing having a swipe channel formed therein, said channel comprising two opposing walls located a sufficient distance apart to allow passage of a magnetic stripe card;

a magnetic stripe reader head mounted within said housing and extending through an aperture in one of said opposing walls; and an optical scanning unit positioned in said housing; wherein said magnetic stripe reader head and said optical scanning unit are disposed within said channel so as to allow simultaneous reading of said data encoded on said magnetic stripe and scanning of a signature located in said signature block during a single swipe of said magnetic stripe card through said channel;

electronically reading said magnetically encoded data;

optically scanning said signature;

outputting the scanned signature to a display;

obtaining said cardholder's signature; and visually comparing the cardholder's signature with the scanned signature.

26. The method according to claim 25 wherein said step of obtaining said cardholder's signature comprises obtaining said cardholder's signature on paper.

27. The method according to claim 25 wherein said step of obtaining said cardholder's signature comprises obtaining a digitized copy entered via a touch responsive input device.

* * * * *